United States Patent
Cui et al.

(10) Patent No.: US 12,183,110 B2
(45) Date of Patent: Dec. 31, 2024

(54) AUTONOMOUS AERIAL VEHICLE PROJECTION ZONE SELECTION

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Sangar Dowlatkhah, Cedar Hill, TX (US); Sameena Khan, Peachtree Corners, GA (US); Troy Paige, Buford, GA (US); Ari Craine, Marietta, GA (US); Robert Koch, Peachtree Corners, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 579 days.

(21) Appl. No.: 17/107,748

(22) Filed: Nov. 30, 2020

(65) Prior Publication Data

US 2022/0171963 A1 Jun. 2, 2022

(51) Int. Cl.
*G06V 40/10* (2022.01)
*B64U 10/13* (2023.01)
(Continued)

(52) U.S. Cl.
CPC ........... *G06V 40/103* (2022.01); *B64U 10/13* (2023.01); *G05D 1/0094* (2013.01); *B64U 2101/30* (2023.01); *B64U 2201/10* (2023.01)

(58) Field of Classification Search
CPC .... G06V 40/103; G06V 20/53; G06V 10/764; G06V 20/17; B64C 39/024; G05D 1/0094; B64U 2101/00; B64U 2201/10
See application file for complete search history.

(56) References Cited

U.S. PATENT DOCUMENTS

| 5,295,551 A | 3/1994 | Sukonick |
| 5,636,123 A | 6/1997 | Rich et al. |

(Continued)

FOREIGN PATENT DOCUMENTS

| CN | 105278759 B | 1/2016 |
| CN | 107945103 A | 4/2018 |

(Continued)

OTHER PUBLICATIONS

Mueller, et al., "Jogging with a Quadcopter", CHI 2015, Apr. 18, 2015, exertiongameslab.org, downloaded from http://exertiongameslab.org/wp-content/uploads/2011/07/quadcopter_chi2015.pdf, 10 pages.

(Continued)

*Primary Examiner* — Peter D Nolan
*Assistant Examiner* — Anwar Mohamed

(57) ABSTRACT

A processing system of an autonomous aerial vehicle including at least one processor may determine informational data to present for at least one person, capture at least a first image via at least one imaging sensor of the autonomous aerial vehicle in a vicinity of the at least one person and determine a first position and a first orientation of the at least one person. The processing system may then identify, based upon the first position and the first orientation of the at least one person, a plurality of candidate projection areas, each candidate projection area comprising a contiguous area within the at least the first image that is deemed to be visible to the at least one person, select one of the plurality of candidate projection areas as a projection zone, and project the informational data on the projection zone via a projector.

20 Claims, 4 Drawing Sheets

(51) Int. Cl.
*G05D 1/00* (2006.01)
*B64U 101/30* (2023.01)

(56) References Cited

U.S. PATENT DOCUMENTS

| | | |
|---|---|---|
| 7,415,331 B2 | 8/2008 | Dapp et al. |
| 7,451,023 B2 | 11/2008 | Appleby et al. |
| 7,737,878 B2 | 6/2010 | Van Tooren et al. |
| 8,914,182 B2 | 12/2014 | Casado et al. |
| 8,948,935 B1 | 2/2015 | Peeters et al. |
| 9,169,030 B2 | 10/2015 | Wong et al. |
| 9,317,034 B2 | 4/2016 | Hoffman et al. |
| 9,405,181 B2 | 8/2016 | Wong et al. |
| 9,464,907 B1 | 10/2016 | Hoareau et al. |
| 9,523,986 B1 | 12/2016 | Abebe et al. |
| 9,567,077 B2 | 2/2017 | Mullan et al. |
| 9,691,285 B2 | 6/2017 | Jarrell |
| 9,713,675 B2 | 7/2017 | Levien et al. |
| 9,720,519 B2 | 8/2017 | Verma |
| 9,754,496 B2 | 9/2017 | Chan et al. |
| 9,760,087 B2 | 9/2017 | Hoareau et al. |
| 9,798,329 B2 | 10/2017 | Shattil |
| 9,835,709 B2 | 12/2017 | Tran et al. |
| 9,848,459 B2 | 12/2017 | Darrow et al. |
| 9,854,206 B1 | 12/2017 | Ren et al. |
| 9,861,075 B2 | 1/2018 | Shen et al. |
| 9,896,202 B2 | 2/2018 | Jourdan |
| 9,940,525 B2 | 4/2018 | Wolf |
| 9,943,965 B2 | 4/2018 | Moore |
| 9,977,428 B2 | 5/2018 | Hall |
| 9,984,579 B1 | 5/2018 | Harris et al. |
| 9,986,378 B2 | 5/2018 | Jones |
| 10,050,760 B2 | 8/2018 | Ross et al. |
| 10,073,336 B2 | 9/2018 | Maes et al. |
| 10,155,166 B1 | 12/2018 | Taylor et al. |
| 10,159,218 B2 | 12/2018 | Shen et al. |
| 10,203,701 B2 | 2/2019 | Kurdi et al. |
| 10,254,766 B2 | 4/2019 | High et al. |
| 10,269,257 B1 | 4/2019 | Gohl et al. |
| 10,274,952 B2 | 4/2019 | Cantrell et al. |
| 10,308,430 B1 | 6/2019 | Brady et al. |
| 10,313,638 B1 | 6/2019 | Yeturu et al. |
| 10,325,506 B2 | 6/2019 | Goddemeier et al. |
| 10,331,124 B2 | 6/2019 | Ferguson et al. |
| 10,332,394 B2 | 6/2019 | Gomez Gutierrez et al. |
| 10,354,537 B2 | 7/2019 | Beaurepaire et al. |
| 10,372,122 B2 | 8/2019 | Zach |
| 10,440,229 B2 | 10/2019 | Drako |
| 10,441,020 B1 | 10/2019 | Andon et al. |
| 10,453,345 B2 | 10/2019 | Greenberger et al. |
| 10,467,885 B2 | 11/2019 | Trundle et al. |
| 10,481,600 B2 | 11/2019 | Yen et al. |
| 10,501,180 B2 | 12/2019 | Yu |
| 10,565,395 B2 | 2/2020 | Matusek et al. |
| 10,586,464 B2 | 3/2020 | Dupray et al. |
| 10,600,326 B2 | 3/2020 | Kim et al. |
| 10,607,462 B2 | 3/2020 | Drako |
| 10,636,297 B2 | 4/2020 | Wang et al. |
| 10,643,406 B2 | 5/2020 | Arya et al. |
| 10,654,482 B2 | 5/2020 | Urano et al. |
| 10,655,968 B2 | 5/2020 | Rezvani |
| 10,672,278 B2 | 6/2020 | Deluca et al. |
| 10,676,022 B2 | 6/2020 | Zevenbergen et al. |
| 10,683,088 B2 | 6/2020 | Erickson et al. |
| 10,706,634 B1 | 7/2020 | Baumbach et al. |
| 10,748,429 B2 | 8/2020 | Bosworth |
| 10,761,544 B2 | 9/2020 | Anderson et al. |
| 10,762,795 B2 | 9/2020 | Contreras et al. |
| 10,762,797 B2 | 9/2020 | Navot et al. |
| 10,765,378 B2 | 9/2020 | Hall et al. |
| 10,818,187 B2 | 10/2020 | Perko |
| 11,217,126 B2* | 1/2022 | Marshall ............... G05D 1/104 |
| 2005/0259150 A1 | 11/2005 | Furumi et al. |
| 2007/0288132 A1 | 12/2007 | Lam |
| 2015/0202770 A1 | 7/2015 | Patron et al. |
| 2015/0269258 A1 | 9/2015 | Hunt, Jr. |
| 2015/0350614 A1 | 12/2015 | Meier et al. |
| 2016/0214717 A1 | 7/2016 | De Silva |
| 2016/0246297 A1 | 8/2016 | Song |
| 2016/0349746 A1* | 12/2016 | Grau ............... G05D 1/102 |
| 2016/0373699 A1 | 12/2016 | Torres et al. |
| 2017/0081026 A1 | 3/2017 | Winn et al. |
| 2017/0278409 A1 | 9/2017 | Johnson et al. |
| 2017/0291608 A1 | 10/2017 | Engel et al. |
| 2017/0368413 A1 | 12/2017 | Shavit |
| 2018/0035606 A1 | 2/2018 | Burdoucci |
| 2018/0072416 A1 | 3/2018 | Cantrell et al. |
| 2018/0079463 A1* | 3/2018 | Pearce ............... B62J 45/412 |
| 2018/0136659 A1 | 5/2018 | Matloff |
| 2018/0162504 A1 | 6/2018 | Lindsø |
| 2018/0189197 A1* | 7/2018 | Hildreth ............... A63H 27/12 |
| 2018/0232580 A1 | 8/2018 | Wolf |
| 2018/0259960 A1 | 9/2018 | Cuban et al. |
| 2018/0308130 A1 | 10/2018 | Hafeez et al. |
| 2019/0035128 A1 | 1/2019 | Russell |
| 2019/0051224 A1* | 2/2019 | Marshall ............... B64C 39/024 |
| 2019/0052852 A1 | 2/2019 | Schick et al. |
| 2019/0061942 A1 | 2/2019 | Miller |
| 2019/0112048 A1 | 4/2019 | Culver |
| 2019/0135450 A1 | 5/2019 | Zhou et al. |
| 2019/0185158 A1 | 6/2019 | Blake et al. |
| 2019/0197254 A1 | 6/2019 | Salgar |
| 2019/0227557 A1 | 7/2019 | Kim et al. |
| 2019/0238338 A1 | 8/2019 | OBrien et al. |
| 2019/0324456 A1 | 10/2019 | Ryan et al. |
| 2019/0339712 A1 | 11/2019 | Williams et al. |
| 2019/0369641 A1 | 12/2019 | Gillett |
| 2019/0377345 A1 | 12/2019 | Bachrach et al. |
| 2020/0014759 A1 | 1/2020 | Wunderlich |
| 2020/0032484 A1 | 1/2020 | ODonnell |
| 2020/0042013 A1 | 2/2020 | Kelkar et al. |
| 2020/0043347 A1 | 2/2020 | Wartofsky |
| 2020/0066147 A1 | 2/2020 | Vadillo et al. |
| 2020/0066163 A1 | 2/2020 | Emsbach et al. |
| 2020/0082731 A1 | 3/2020 | Choi et al. |
| 2020/0094964 A1 | 3/2020 | Myslinski |
| 2020/0103882 A1 | 4/2020 | Sullivan et al. |
| 2020/0130827 A1 | 4/2020 | Kozak |
| 2020/0145619 A1 | 5/2020 | Drako |
| 2020/0183384 A1 | 6/2020 | Noh et al. |
| 2020/0207371 A1 | 7/2020 | Dougherty et al. |
| 2020/0250848 A1 | 8/2020 | Kim et al. |
| 2020/0262450 A1 | 8/2020 | Pan |
| 2020/0265701 A1 | 8/2020 | Schenker et al. |
| 2020/0265723 A1 | 8/2020 | Gordon et al. |
| 2020/0273353 A1 | 8/2020 | OConnell et al. |
| 2020/0341471 A1 | 10/2020 | Kozak |
| 2020/0356115 A1 | 11/2020 | Kubie |
| 2020/0357288 A1 | 11/2020 | Stewart et al. |

FOREIGN PATENT DOCUMENTS

| | | |
|---|---|---|
| EP | 3525157 A1 | 8/2019 |
| EP | 3667451 A1 | 6/2020 |
| KR | 102160722 B1 | 9/2020 |
| TW | I693959 B | 5/2020 |
| WO | 2016210156 A1 | 12/2016 |
| WO | 2017055080 A1 | 4/2017 |
| WO | 2017065107 A1 | 4/2017 |
| WO | 2017068224 A1 | 4/2017 |
| WO | 2017157863 A1 | 9/2017 |
| WO | 2018052352 A1 | 3/2018 |
| WO | 2019006769 A1 | 1/2019 |
| WO | 2019235667 A1 | 12/2019 |
| WO | 2020057887 A1 | 3/2020 |
| WO | 2020072387 A1 | 4/2020 |

OTHER PUBLICATIONS

Graether, et al., Joggobot: A Flying Robot as Jogging Companion, CHI 2012, May 5, 2012, exertiongameslab.org downloaded from https://exertiongameslab.org/wp-content/uploads/2011/07/joggobot_chi2012.pdf, pp. 263-264.

(56) References Cited

OTHER PUBLICATIONS

Al Zayer, Majed, et al. "Exploring the Use of a Drone to Guide Blind Runners", Proceedings of the 18th International ACM SIGACCESS Conference on Computers and Accessibility, 2016, downloaded from https://rrl.cse.unr.edu/media/documents/2016/p263-alzayer.pdf.

Alshareef, Hazzaa N., and Dan Grigoras. "An adaptive task scheduler for a cloud of drones", 2018 4th International Conference on Cloud Computing Technologies and Applications (Cloudtech), IEEE, Nov. 2018, 9 pages.

Altawy, Riham and Youssef, Amr. M., "Security, Privacy, and Safety Aspects of Civilian Drones: A Survey", researchgate.net, ACM Transactions on Cyber-Physical Systems, Nov. 2016, 25 pages.

Amato, Andrew, "Projector Drone Turns Any Surface Into a Video Screen," DRONELIFE.com, dronelife.com, Jun. 26, 2014, 2 pages, downloaded from https://web.archive.org/web/20140804122610/https://dronelife.com/2014/06/26/projector-drone-turns-surface-video-screen/.

Bertram, Joshua R., Peng Wei, and Joseph Zambreno. "Scalable FastMDP for Pre-departure Airspace Reservation and Strategic De-conflict." arXiv preprint arXiv:2008.03518 (2020).

Blank, Peter; Kirrane, Sabrina; and Spiekerman, Sarah. "Privacy-Aware Restricted Areas for Unmanned Aerial Systems", computer.org. IEEE Computer and Reliability Societies, Mar./Apr. 2018, vol. 16, pp. 70-79.

Brock, Anke M., et al. "FlyMap: Interacting with Maps Projected from a Drone", Proceedings of the 7th ACM International Symposium on Pervasive Displays. 2018, 9 pages.

Bui, Khac-Hoai Nam, and Jason J. Jung, "Internet of agents framework for connected vehicles: A case study on distributed traffic control system", J. Parallel Distrib. Comput., (2017), 26 pages.

Cameron, Lori, "Building a Framework to Protect Your Privacy from Drones," computer.org. Accessed, Nov. 10, 2020, IEEE Computer Society, (2020), 2 pages.

Choi, Han-Lim, Luc Brunet, and Jonathan P. How, "Consensus-Based Decentralized Auctions for Robust Task Allocation", Robotics, IEEE Transactions on Robotics 25.4 (2009): 912-926.

Colley, Ashley, et al. "Investigating Drone Motion as Pedestrian Guidance", Proceedings of the 16th International Conference on Mobile and Ubiquitous Multimedia, 2017, 9 pages.

Frias-Martinez, Vanessa, Elizabeth Sklar, and Simon Parsons, "Exploring auction mechanisms for role assignment in teams of autonomous robots," Robot Soccer World Cup. Springer, Berlin, Heidelberg, 2004, 12 pages.

Irfan, Muhammad, and Adil Farooq, "Auction-based Task Allocation Scheme for Dynamic Coalition Formations in Limited Robotic Swarms with Heterogeneous Capabilities," 2016 International Conference on Intelligent Systems Engineering(ICISE). IEEE, 2016.

Isop, W., Pestana, J., Ermacora, G., Fraundorfer, F. & Schmalstieg, D., "Micro Aerial Projector—Stabilizing Projected Images of an Airborne Robotics Projection Platform", 2016 IEEE/RSJ International conference on Intelligent Robots and Systems (IROS), Daejeon convention Center, Oct. 2016, pp. 5618-5625.

Kamali, Maryam, et al. "Formal verification of autonomous vehicle platooning", Science of Computer Programming 148 (2017), 88-106 19 pages.

Lee, Eun-Kyu, et al., "Internet of Vehicles: From intelligent grid to autonomous cars and vehicular fogs", International Journal of Distributed Sensor Networks, vol. 12, No. 9, (2016), 14 pages.

Lucien, Laurent, et al., "A Proposition of Data Organization and Exchanges to Collaborate in an Autonomous Agent context", 2016 IEEE Intl Conference on Computational Science and Engineering (CSE) and IEEE Intl Conference on Embedded and Ubiquitous Computing (EUC) and 15th Intl Symposium on Distributed Computing and Applications for Business Engineering (DCABES), IEEE, 2016, 8 pages.

Minaeian, S., Liu, J., & Son, Y. (2018). "Effective and Efficient Detection of Moving Targets From a UAV's Camera", IEEE Transactions on Intelligent Transportation Systems, vol. 19, No. 2, Feb. 2018, pp. 497-506.

Pongpunwattana, Anawat, and Rolf Rysdyk. "Real-time planning for multiple autonomous vehicles in dynamic uncertain environments", Journal of Aerospace Computing, Information, and Communication 1.12 (2004): 580-604.

Porfiri, Maurizio, D. Gray Roberson, and Daniel J. Stilwell, "Tracking and Formation Control of Multiple Autonomous Agents: A two-level consensus approach", Automatica vol. 43, No. 8 (2007), pp. 1318-1328.

Raboin, Eric, et al. "Model-predictive asset guarding by team of autonomous surface vehicles in environment with civilian boats", Autonomous Robots 38.3 (2015), pp. 261-282.

Scheible, J. Funk, M. (2016). "In-Situ-DisplayDrone: Facilitating Co-located Interactive Experiences via A Flying Screen", In Proceedings of the 5th ACM International Symposium on Pervasive Displays (PerDis '16). Association for Computing Machinery, 251-252.

Scheible, Jurgen, et al. "Displaydrone: A Flying Robot Based Interactive Display", Proceedings of the 2nd ACM International Symposium on Pervasive Displays, 2013, 6 pages.

Schneider, Eric, et al. "Auction-based task allocation for multi-robot teams in dynamic environments." Conference Towards Autonomous Robotic Systems. Springer, Cham, 2015.

Xiang, Xianbo, Bruno Jouvencel, and Olivier Parodi, "Coordinated Formation Control of Multiple Autonomous Underwater Vehicles for Pipeline Inspection", International Journal of Advanced Robotic Systems, vol. 7, No. 1 (2010), pp. 075-084.

Yaacoub, Jean-Paul et al.,"Security analysis of drones systems: Attacks, limitations, and recommendations", Internet of Things 11, 2020, 40 pages.

Yu, Jun, et al. "iPrivacy: image privacy protection by identifying sensitive objects via deep multi-task learning." IEEE Transactions on Information Forensics and Security, vol. 12, No. 5, (2017): 1005-1016.

Zhu, Guodong, and Peng Wei. "Pre-Departure Planning for Urban Air Mobility Flights with Dynamic Airspace Reservation", AIAA Aviation 2019 Forum, 2019, 11 pages, downloaded from https://cpb-us-W2.wpmucdn.com/web.seas.gwu.edu/dist/9/15/files/2019/07/aviation19_PredeparturePlanning.pdf.

* cited by examiner

AUTONOMOUS AERIAL VEHICLE PROJECTION ZONE SELECTION

The present disclosure relates generally to autonomous aerial vehicle operations, and more particularly to methods, computer-readable media, and apparatuses for identifying candidate projection areas and selecting a candidate projection area as a projection zone for projecting informational data from an autonomous aerial vehicle.

BACKGROUND

Current trends in wireless technology are leading towards a future where virtually any object can be network-enabled and addressable on-network. The pervasive presence of cellular and non-cellular wireless networks, including fixed, ad-hoc, and/or or peer-to-peer wireless networks, satellite networks, and the like along with the migration to a 128-bit IPv6-based address space provides the tools and resources for the paradigm of the Internet of Things (IoT) to become a reality. In addition, drones or autonomous aerial vehicles (AAVs) are increasingly being utilized for a variety of commercial and other useful tasks, such as package deliveries, search and rescue, mapping, surveying, and so forth, enabled at least in part by these wireless communication technologies.

SUMMARY

In one example, the present disclosure describes a method, computer-readable medium, and apparatus for identifying candidate projection areas and selecting a candidate projection area as a projection zone for projecting informational data from an autonomous aerial vehicle. For instance, in one example, a processing system of an autonomous aerial vehicle including at least one processor may determine informational data to present for at least one person, capture at least a first image via at least one imaging sensor of the autonomous aerial vehicle in a vicinity of the at least one person and determine a first position and a first orientation of the at least one person. The processing system may then identify, based upon the first position and the first orientation of the at least one person, a plurality of candidate projection areas, each candidate projection area comprising a contiguous area within the at least the first image that is deemed to be visible to the at least one person, select one of the plurality of candidate projection areas as a projection zone, and project the informational data on the projection zone via a projector.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
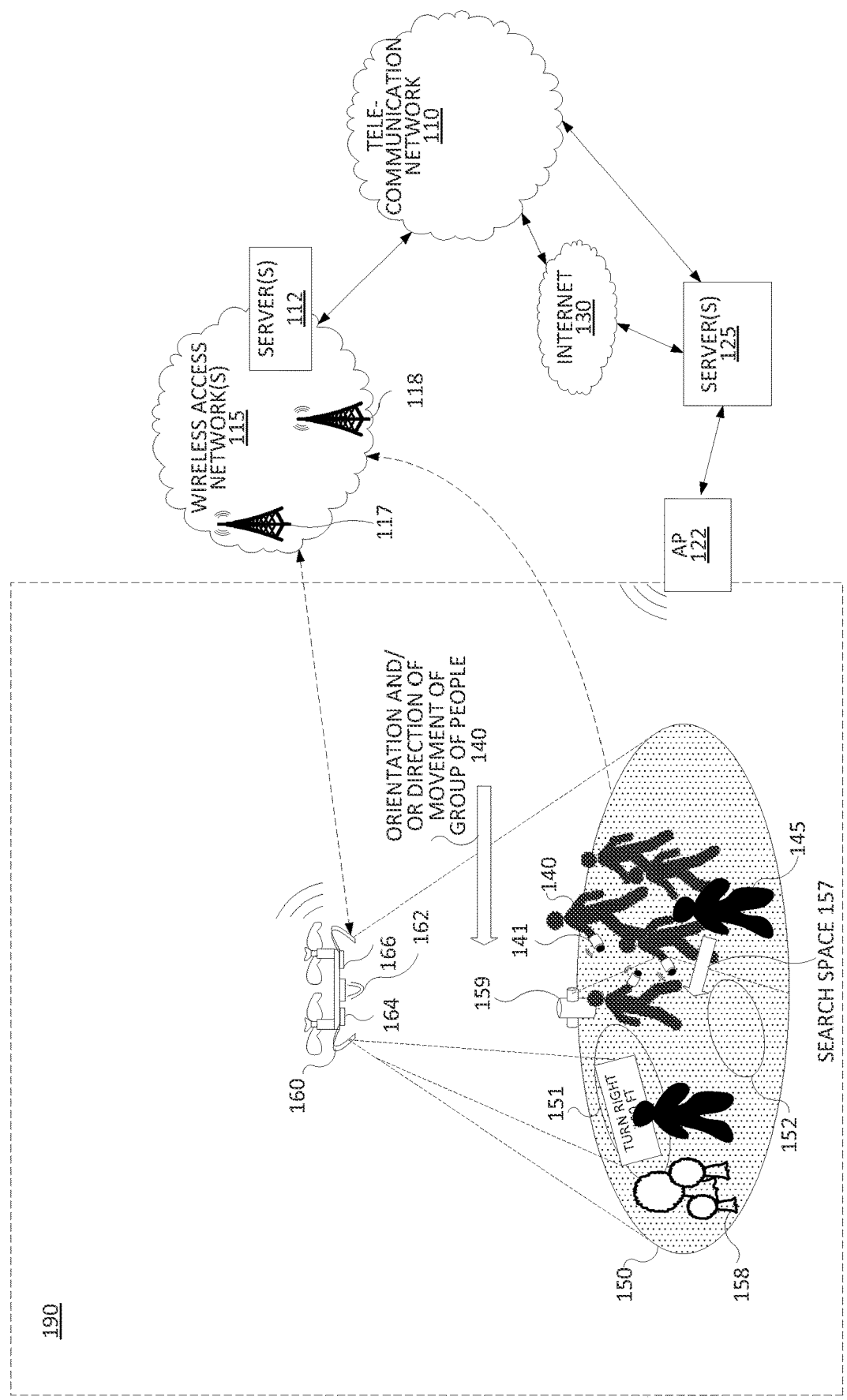
FIG. 1 illustrates an example system related to the present disclosure.

Examples of the present disclosure describe methods, computer-readable media, and apparatuses for identifying candidate projection areas and selecting a candidate projection area as a projection zone for projecting informational data from an autonomous aerial vehicle. In particular, examples of the present disclosure relate to an autonomous aerial vehicle (AAV) determining optimal locations to provide informative projections to communicate with people. In the course of doing so, the AAV may need to analyze the surroundings in order to optimize the projection so it is most clearly communicated. This is particularly useful when the communication is intended for more than one recipient within the same area and when the communication is public in nature.

To illustrate, at a time t1, an AAV may have an imaging sensor field-of-view defined by an area. The imaging sensor may comprise an optical camera, a light detection and ranging (LiDAR) sensor/unit, or the like. Within the field-of-view area, the AAV may identify one or more people to which the AAV may communicate information. The position(s) and orientation(s)/direction(s) of travel of these one or more people may determine the locations of one or more candidate projection areas. In one example, the AAV may seek to communicate with people walking in a certain direction, for instance at a venue or an event, such as a stadium or a theme park. The information to be communicated may be, for instance, directional information for target audience members to reach a seating area or advertising information for a nearby restaurant or concession stand.

The AAV may be directed to an area by instructions from a fleet management system, or command center, or may enter an area based on its own analysis. For instance, the AAV may analyze imaging sensor data it collects to identify higher density areas of pedestrians to maximize the impact of a projected advertisement. In another example, if the AAV is tasked with displaying directional instructions during an evacuation, the AAV may identify, from the captured imaging sensor data, pockets of pedestrians walking in the wrong direction. In another example, the fleet management system, or command center, may identify pockets of pertinent recipients of the projected information by tracking users who have opted-in to location tracing, e.g., via a mobile device application that permits anonymous tracking while at a venue or within an area. The fleet management system, or command center may direct the AAV to the area accordingly.

To determine candidate projection areas, the AAV may first determine a projection search space that is (1) within the field of view of the AAV's imaging sensors. (2) that is within the range of the AAV's projector, and (3) that is most visible to the target audience. Within this space, the AAV may then use image processing techniques to analyze the captured image(s) to identify candidate projection areas. The candidate projection areas may comprise contiguous areas within the space that are relatively free of objects, painted markings, irregularities, or other items that would distort a projected image. The AAV may then select a projection zone (e.g., an "optimal" projection zone) from among the candidate projection zones. For example, the optimal projection zone may be the largest contiguous area (e.g., the largest candidate projection zone) within the space that is most free of objects, painted markings, irregularities, or other items that would distort a projected image. The AAV may then project the information (i.e., visual information) within the optimal projection zone.

As a result of processing the image(s) containing the optimal projection zone, the AAV may detect trip hazards or other obstacles, and may additionally include projected lighting to highlight these hazards to the target audience. This technique may be used in a similar fashion to highlight other objects of significance that the image analysis may detect. For example, the image analysis may seek and detect a fire hydrant for directing first responders, and the AAV may project a directed beam of light near or on the fire hydrant.

At time t1, the AAV may project visual information in a first optimal projection zone. At a later time, t2, as the target audience and the AAV have moved, the AAV may capture one or more images and identify a second search space. The AAV may again analyze the image(s) and identify a new optimal projection zone. The new optimal projection zone may be in a different location, and may be a different size and/or shape from the prior zone. The AAV adjusts the size of the projected visual information accordingly, and projects the visual information within the optimal projection zone. As the target audience and the AAV travel over a route, at times t3, t4, etc. the optimal projection zone may change in size, shape, orientation, and/or location (e.g., on a continuous basis, periodically, etc.). Accordingly, the projected visual information may change in size, shape, location and/or orientation in response to the movement of the target audience.

In some cases, the optimal projection zone may be on a surface other than the ground. In other cases, the AAV may remain stationary (e.g., not traversing along a path), but the optimal projection zone may change over time. For instance, the AAV may be assigned to project visual information on a portion of roadway. To avoid a projection on top of vehicles, the AAV may remain stationary or relatively stationary, but may move the optimal projection zone to project onto the largest open portion of pavement. These and other aspects of the present disclosure are discussed in greater detail below in connection with the examples of FIGS. 1-4.

To aid in understanding the present disclosure, FIG. 1 illustrates an example system 100, related to the present disclosure. As shown in FIG. 1, the system 100 connects user devices 141, server(s) 112, server(s) 125, and autonomous aerial vehicle(s) (AAVs 160), with one another and with various other devices via a core network, e.g., a telecommunication network 110, a wireless access network 115 (e.g., a cellular network), and Internet 130. It should be noted that multiple AAVs 160 can be deployed in accordance with the present disclosure but only one AAV 160 is shown in FIG. 1 for clarity purposes.

Figure 3:
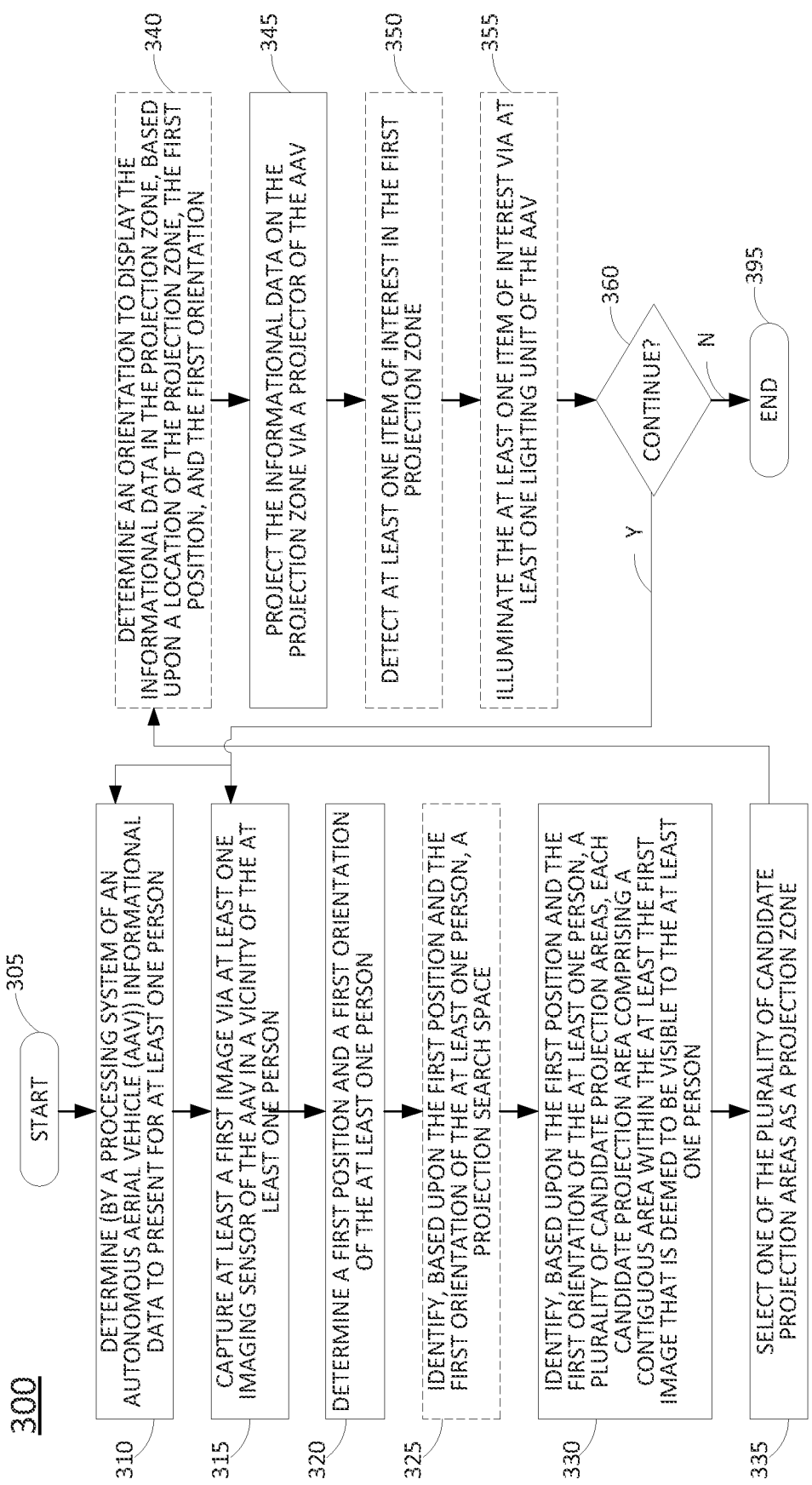
FIG. 3 illustrates a flowchart of an example method for identifying candidate projection areas and selecting a candidate projection area as a projection zone for projecting informational data from an autonomous aerial vehicle.
Figure 4:
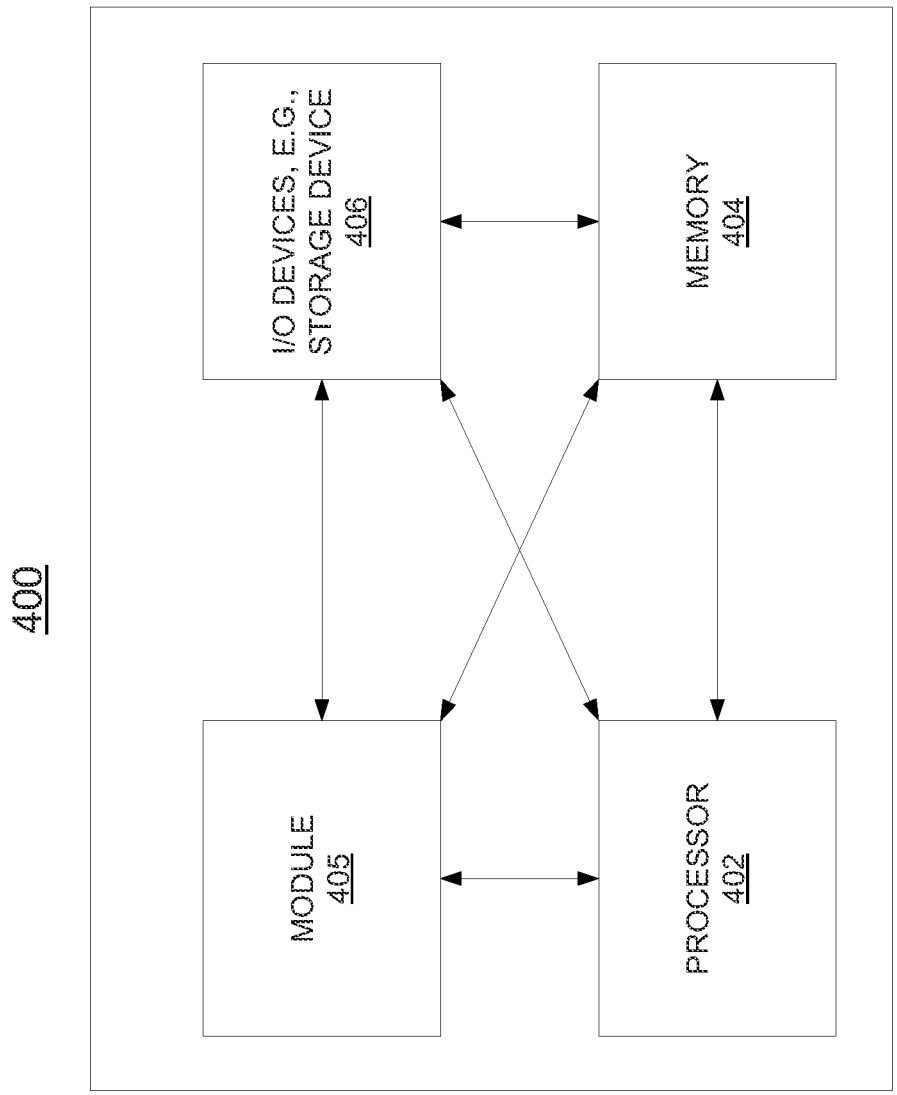
FIG. 4 illustrates an example high-level block diagram of a computing device specifically programmed to perform the steps, functions, blocks, and/or operations described herein.

In one example, the server(s) 125 may each comprise a computing device or processing system, such as computing system 400 depicted in FIG. 4, and may be configured to perform one or more steps, functions, or operations for identifying candidate projection areas and selecting a candidate projection area as a projection zone for projecting informational data from an autonomous aerial vehicle. For instance, an example method for identifying candidate projection areas and selecting a candidate projection area as a projection zone for projecting informational data from an autonomous aerial vehicle is illustrated in FIG. 3 and described below. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 4 and discussed below) or multiple computing devices collectively configured to perform various steps, functions, and/or operations in accordance with the present disclosure.

In one example, server(s) 125 may comprise an AAV fleet management system or a network-based AAV support service. For instance, server(s) 125 may receive and store information regarding AAVs, such as (for each AAV): an identifier of the AAV, a maximum operational range of the AAV, a current operational range of the AAV, capabilities or features of the AAV, such as maneuvering capabilities, payload/lift capabilities (e.g., including maximum weight, volume, etc.), sensor and recording capabilities, lighting capabilities, visual projection capabilities, sound broadcast capabilities, and so forth. In one example, server(s) 125 may direct AAVs in providing information services to individuals or groups of people, as described herein.

To illustrate, server(s) 125 may store detection models that may be applied to sensor data received from AAVs, e.g., in order to detect items of interest in an environment. For instance, in one example, AAVs may include on-board processing systems with one or more detection models for detecting objects or other items in an environment/space/area such as: rough terrain, people, animals, buildings, walls, fences, waterways, etc. However, as an alternative, or in addition, AAVs may transmit sensor data to server(s) 125, which may apply detection models to the sensor data in order to similarly detect such items in the visual/sensor data.

In one example, the detection models may be implemented and/or trained to detect particular objects or other items as being of a specific type or category, e.g., "stairs," "retaining wall," "stream," "grass," "concrete pavement," "asphalt pavement," "fire hydrant," "sidewalk," "stones," "trees," etc. However, in another example, the detection models may alternatively or additional detect items at a coarser level, e.g., "rough terrain," "uneven surface," etc., or more simply "good" or "bad" spaces and/or surfaces for visual projections of informational data. The MLMs, or signatures, may be specific to particular types of visual/image and/or spatial sensor data, or may take multiple types of sensor data as inputs. For instance, with respect to images or video, the input sensor data may include low-level invariant image data, such as colors (e.g., RGB (red-green-blue) or CYM (cyan-yellow-magenta) raw data (luminance values) from a CCD/photo-sensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like.

For instance, these features could be used to help quantify and distinguish shimmering water, a flag on a flagpole, etc. from other types of images/object and/or other features.

As noted above, in one example, MLMs, or signatures, may take multiple types of sensor data as inputs. For instance, MLMs or signatures may also be provided for detecting particular items based upon LiDAR input data, infrared camera input data, and so on. In accordance with the present disclosure, a detection model may comprise a machine learning model (MLM) that is trained based upon the plurality of features available to the system (e.g., a "feature space"). For instance, one or more positive examples for a feature may be applied to a machine learning algorithm (MLA) to generate the signature (e.g., a MLM). In one example, the MLM may comprise the average features representing the positive examples for an item in a feature space. Alternatively, or in addition, one or more negative examples may also be applied to the MLA to train the MLM. The machine learning algorithm or the machine learning model trained via the MLA may comprise, for example, a deep learning neural network, or deep neural network (DNN), a generative adversarial network (GAN), a support vector machine (SVM), e.g., a binary, non-binary, or multi-class classifier, a linear or non-linear classifier, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on. In one example, a trained detection model may be configured to process those features which are determined to be the most distinguishing features of the associated item, e.g., those features which are quantitatively the most different from what is considered statistically normal or average from other items that may be detected via a same system, e.g., the top 20 features, the top 50 features, etc.

In one example, detection models (e.g., MLMs) may be deployed in AAVs, and/or in a network-based processing system to process sensor data from one or more AAV sensor sources (e.g., cameras, LiDAR, and/or other sensors of AAVs), and to identify patterns in the features of the sensor data that match the detection model(s) for the respective item(s). In one example, a match may be determined using any of the visual features mentioned above, e.g., and further depending upon the weights, coefficients, etc. of the particular type of MLM. For instance, a match may be determined when there is a threshold measure of similarity among the features of the sensor data streams(s) and an item signature.

In one example, the system 100 includes a telecommunication network 110. In one example, telecommunication network 110 may comprise a core network, a backbone network or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs), and so forth. It should be noted that an IP network is broadly defined as a network that uses Internet Protocol to exchange data packets. However, it will be appreciated that the present disclosure is equally applicable to other types of data units and transport protocols, such as Frame Relay, and Asynchronous Transfer Mode (ATM). In one example, the telecommunication network 110 uses a network function virtualization infrastructure (NFVI), e.g., host devices or servers that are available as host devices to host virtual machines comprising virtual network functions (VNFs). In other words, at least a portion of the telecommunication network 110 may incorporate software-defined network (SDN) components.

In one example, one or more wireless access networks 115 may each comprise a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network(s) 115 may each comprise an access network in accordance with any "second generation" (2G), "third generation" (3G), "fourth generation" (4G), Long Term Evolution (LTE), "fifth generation" (5G), or any other existing or yet to be developed future wireless/cellular network technology. While the present disclosure is not limited to any particular type of wireless access network, in the illustrative example, base stations 117 and 118 may each comprise a Node B, evolved Node B (eNodeB), or gNodeB (gNB), or any combination thereof providing a multi-generational/multi-technology-capable base station. In the present example, user devices 141, and AAV 160 may be in communication with base stations 117 and 118, which provide connectivity between AAV 160, user devices 141, and other endpoint devices within the system 100, various network-based devices, such as server(s) 112, server(s) 125, and so forth. In one example, wireless access network(s) 115 may be operated by the same service provider that is operating telecommunication network 110, or one or more other service providers. It should be noted that for ease of illustration, only one of the user devices 141 is specifically labeled in FIG. 1 (and similarly only one of the members of the group of people 140, and one of non-group members 145).

For instance, as shown in FIG. 1, wireless access network(s) 115 may also include one or more servers 112, e.g., edge servers at or near the network edge. In one example, each of the server(s) 112 may comprise a computing device or processing system, such as computing system 400 depicted in FIG. 4 and may be configured to provide one or more functions in support of examples of the present disclosure for identifying candidate projection areas and selecting a candidate projection area as a projection zone for projecting informational data from an autonomous aerial vehicle. For example, one or more of the server(s) 112 may be configured to perform one or more steps, functions, or operations in connection with the example method 300 described below. In one example, server(s) 112 may perform the same or similar functions as server(s) 125. For instance, telecommunication network 110 may provide a fleet management system, e.g., as a service to one or more subscribers/customers, in addition to telephony services, data communication services, television services, etc. In one example, server(s) 112 may operate in conjunction with server(s) 125 to provide an AAV fleet management system and/or a network-based AAV support service. For instance, server(s) 125 may provide more centralized services, such as AAV authorization and tracking, maintaining user accounts, creating new accounts, tracking account balances, accepting payments for services, etc., while server(s) 112 may provide more operational support to AAVs, such as assigning AAVs to tasks (such as providing visual information to an individual or group of people in an area, e.g., evacuation directions, directions from a parking lot to a venue, etc.), for obtaining user location information (e.g., location information of user devices 141), and providing such information to AAVs, and so on. It is noted that this is just one example of a possible distributed architecture for an AAV fleet management system and/or a network-based AAV support service. Thus, various other configurations including various data centers, public and/or private cloud servers, and so forth may be deployed. For ease of illustration, various additional elements of wireless access network(s) 115 are omitted from FIG. 1.

As illustrated in FIG. 1, user devices 141 may each comprise, for example, a wireless enabled wristwatch. In various examples, user devices 141 may each comprise a cellular telephone, a smartphone, a tablet computing device, a laptop computer, a head-mounted computing device (e.g., smart glasses), or any other wireless and/or cellular-capable mobile telephony and computing devices (broadly, a "mobile device" or "mobile endpoint device"). In one example, user devices 141 may be equipped for cellular and non-cellular wireless communication. For instance, user devices 141 may include components which support peer-to-peer and/or short range wireless communications. Thus, user devices 141 may include one or more radio frequency (RF) transceivers, e.g., for cellular communications and/or for non-cellular wireless communications, such as for IEEE 802.11 based communications (e.g., Wi-Fi, Wi-Fi Direct), IEEE 802.15 based communications (e.g., Bluetooth, Bluetooth Low Energy (BLE), and/or ZigBee communications), and so forth. In another example, user devices 141 may instead comprise radio frequency identification (RFID) tags that may be detected by AAVs.

In accordance with the present disclosure, AAV 160 may include a camera 162 and one or more radio frequency (RF) transceivers 166 for cellular communications and/or for non-cellular wireless communications. In one example, AAV 160 may also include one or more module(s) 164 with one or more additional controllable components, such as one or more: microphones, loudspeakers, infrared, ultraviolet, and/or visible spectrum light sources, projectors, light detection and ranging (LiDAR) units, temperature sensors (e.g., thermometers), and so forth.

In addition, AAV 160 may include on-board processing system to perform steps, functions, and/or operations for identifying candidate projection areas and selecting a candidate projection area as a projection zone for projecting informational data from an autonomous aerial vehicle, and for controlling various components of the respective AAVs. For instance, AAVs 160 and 161 may each comprise all or a portion of a computing device or processing system, such as computing system 400 as described in connection with FIG. 4 below, specifically configured to perform various steps, functions, and/or operations for identifying candidate projection areas and selecting a candidate projection area as a projection zone for projecting informational data from an autonomous aerial vehicle. For instance, an example method 300 for identifying candidate projection areas and selecting a candidate projection area as a projection zone for projecting informational data from an autonomous aerial vehicle is illustrated in FIG. 3 and described in greater detail below.

In an illustrative example, a theme park owner may seek to utilize AAV 160 to provide walking directions as visual information is projected by AAV 160 for a group of people 140 (e.g., a tour group). In one example, at least some of the group of people may be tracked via user devices 141, such as via AAV 160 detecting user devices 141 via RF sensing (e.g., when user devices comprise RFID tags or transponders), via Wi-Fi Direct, LTE Direct, a 5G device-to-device (D2D) sidelink, such as over a P5 interface, and so forth), via Dedicated Short Range Communications (DSRC), e.g., in the 5.9 MHz band, or the like, and so on. In another example, user devices 141 may report location information (e.g., GPS location information) to AAV 160 via direct/peer-to-peer communication, or may report location information to wireless access networks(s) 115. In one example, server(s) 112 may obtain the location information of user devices 141 from wireless access network(s) 115 and may provide the location information to AAV 160.

In one example, AAV 160 may also obtain orientation information regarding the group of people 140. For instance, the user devices 141 may report direction/orientation information to AAV 160 and/or to wireless access network(s) 115, which may forward the direction/orientation information to server(s) 112 and/or AAV 160. In another example, server(s) 112 and/or AAV 160 may track the positions of user devices 141 over a short period of time to determine a direction of movement of the group of people, which may be the same as the orientation(s) of the group of people 140, or which may be assumed to be their orientation(s) for present purposes. It should be noted that in some cases, not all of the group of people 140 may have trackable user devices 141. However, the group of people 140 may be generally tracked in terms of location/position and orientation via a representative set of one or more user devices 141 (e.g., one or more tour group guides). It should be noted that in one example, AAV 160 may obtain or determine a general orientation of the group of people 140, which may not be the same as some of the orientations of individual members of the group of people 140. For example, as illustrated in FIG. 1, at least one of the members of the group of people 140 may be oriented in the opposite direction from the overall orientation of the group of people 140. For instance, it may be that the particular member of the group of people 140 is walking backwards while talking to others in the group, or is sitting in a slow moving electric cart facing backward.

In still another example, as an alternative or in addition to the foregoing, AAV 160 may track the positions/locations and/or orientations of the group of people 140 via LiDAR sensing (e.g., in the 1550 nm range, or other spectrums that are deemed safe for humans). For instance, AAV 160 may learn or be provided with visual identifications of the group of people 140, such that all or a portion of the group of people 140 may continue to be visually tracked via LiDAR sensing/imaging from above. In one example, LiDAR may be used in conjunction with other tracking techniques, e.g., tracking via user devices 141 and confirming via LiDAR, obtaining locations/positions via tracking user devices 141, while obtaining orientations via LiDAR imaging/sensing.

Continuing with the present example, it may be the case that the group of people 140 has an upcoming reservation at a particular ride or show. In this case, server(s) 125 and/or server(s) 112 may comprise a reservation database system or may access the reservation from a separate reservation database system. As such, server(s) 125 and/or server(s) 112 may dispatch AAV 160 to the vicinity of the group of users 140, e.g., in the general area 190, with instructions to corral the group of people 140 toward the destination from their current location.

Upon arrival in the general area 190, AAV 160 may capture at least a first image via at least one imaging sensor of the AAV 160 in a vicinity of the at least one person. The imaging sensor may be the camera 162 or a LiDAR unit of AAV 160. Thus, the at least one image may be an optical image and/or a LiDAR generated image, or rendering. AAV 160 may then determine a position and an orientation of at least one person (e.g., positions and orientations of the group of people 140). For instance, as noted above, this information may be received by AAV 160 from server(s) 125 and/or from server(s) 112, may be obtained by AAV 160 communicating with or sensing user devices 141, and/or may be determined from the at least one image. The at least one image may capture visual data and/or spatial data within an imaging/sensing range 150.

Next, AAV 160 may identify, based upon the position(s) and orientation(s) of the group of people 140, a projection search space 157. For instance, the projection search space 157 may comprise an area that is captured in the image (within the imaging/sensing range 150), that is within range of a projector of AAV 160, and that is deemed to be visible to at least one of the members of the group of people 140. In one example, the projection search space 157 may comprise an area that is captured in the image (in imaging/sensing range 150), that is within range of a projector of AAV 160, and that is in front of the group of people 140 in an overall/collective orientation and/or direction of travel of the group (e.g., within 180 degrees in front of the overall/collective orientation and/or direction of travel, within 120 degrees, 105 degrees, etc.). Within the search space 157, AAV 160 may then identify, based upon the position(s) and orientation(s) of the group of people 140, a plurality of candidate projection areas, each candidate projection area comprising a contiguous area within the at least the first image. In one example, one of the plurality of candidate projection areas is selected as a projection zone based upon one or more factors, e.g., as compared to others of the plurality of candidate projection areas, such as: a number of people within the group of people 140 to whom the one of the plurality of candidate projection areas is deemed to be visible, a size of the one of the plurality of projection areas, a range of the one of the plurality of projection areas with respect to a projector of AAV 160, or a measure of at least one surface characteristic of the one of the plurality of candidate projection areas (e.g., textured, glossy, dark/light, color contrasts, shade contrasts, a number/quantity and/or size of obstruction(s) within the one of the plurality of candidate projection areas (where obstructions can include one or more members of the group of people 140 and/or one or more other people in an area (such as non-group members 145), as well as non-human objects), etc.). In one example, multiple factors may be weighted and combined to derive a score for each of the plurality of candidate projection areas, with a candidate projection area having the best score (e.g., highest or lowest) being selected as the projection zone.

In one example, AAV 160 may perform a multi-stage screening process to identify candidate projection areas meeting certain minimum requirements. For instance, instead of all possible areas comprising contiguous zones with the search space 157, AAV 160 may first identify areas that are relatively free of large objects or surface features that would interfere with a visual projection from AAV 160. For instance, in the example of FIG. 1, the search space 157 may include at least one member of the group of people 140, one of the non-group members 145, bushes 158, and a hydrant 159. These parts of the search space 157 may be deemed to have too many obstructions or non-smooth surface characteristics such that these parts of the search space 157 may be excluded from consideration as candidate projection areas. As such, candidate projection areas 151 and 152 may be the resulting candidate projection areas after screening and excluding other parts of the search space 157.

In this particular example, it can be seen in FIG. 1 that candidate projection areas 151 and 152 are both free of obstructions, do not have rough surface features, and may be approximately the same distance from AAV 160 (and its projector, e.g., one of the modules 164). However, candidate projection area 151 is larger in size than candidate projection area 152. As such, AAV 160 may select candidate projection area 151 as the projection zone. For instance, AAV 160 may project the information data, or visual data, e.g., the message "turn right 100 ft," in/on the projection zone (i.e., candidate projection area 151, which becomes the projection zone). In one example, AAV 160 may also determine an orientation to display the informational data in the projection zone, e.g., based upon a location of the projection zone, and the position(s) and orientation(s) of the group of people 140.

The foregoing illustrates just one example of a system in which examples of the present disclosure for identifying candidate projection areas and selecting a candidate projection area as a projection zone for projecting informational data from an autonomous aerial vehicle may operate. In addition, although the foregoing example is described and illustrated in connection with a group of people 140 in a theme park, it should be noted that various other scenarios may be supported in accordance with the present disclosure. For example, a person or a group of people at a venue may be presented with offers or advertisements for food or drinks nearby. In still another example, a person or group of people may be directed to safety, such as during an evacuation. In this regard, it should be noted that in at least some examples, AAV 160 (and/or other AAVs) may not track people via user devices, but may rely upon local sensing via images captured by camera 162 and/or a LiDAR unit, or the like. For example, AAV 160 may simply be directed to a general area 190 in which the AAV 160 may be tasked with locating and identify any and all people, and directing the people to a safe exit from the area 190. In other words, AAV 160 may not be deployed for a specific person or group of people, but may be looking to present relevant information data via visual projection for any humans in the area 190. In one example, AAV 160 may identify pockets of people and may focus on larger groups first, or may find those people who are furthest from the exit and begin directing those people before addressing others who are closer to the exit, and so forth. In one example, AAV 160 may remain in communication with a fleet management system (e.g., server(s) 125 and/or server(s) 112) to continue to obtain informational data to project. However, in another example, AAV 160 may be given a goal of the task (e.g., safely corral all humans to exit point 1 or exit point 2) and may calculate what informational data to present, where to present it, and when to present it. For instance, at time t1, AAV 160 may present instructions to "turn right 100 feet" in a first projection zone. At time t2, which may be several seconds later, AAV 160 may present instructions in a different projection zone to "turn right 85 feet" since the group of people may have since moved closer to the exit, and so on. In this regard, FIG. 2 and the discussion below illustrates and describes additional examples of identifying candidate projection areas and selecting a candidate projection area as a projection zone for projecting informational data from an autonomous aerial vehicle, in accordance with the present disclosure. In various examples the type of information data that is projected may include text, images, video (including animations), etc., or any combination thereof, depending upon the instructions of an entity controlling or instructing UAV 160, and so on.

It should also be noted that the system 100 has been simplified. In other words, the system 100 may be implemented in a different form than that illustrated in FIG. 1. For example, the system 100 may be expanded to include additional networks, and additional network elements (not shown) such as wireless transceivers and/or base stations, border elements, routers, switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices.

As just one example, one or more operations described above with respect to server(s) 125 may alternatively or additionally be performed by server(s) 112, and vice versa. In addition, although server(s) 112 and 125 are illustrated in the example of FIG. 1, in other, further, and different examples, the same or similar functions may be distributed among multiple other devices and/or systems within the telecommunication network 110, wireless access network(s) 115, and/or the system 100 in general that may collectively provide various services in connection with examples of the present disclosure for identifying candidate projection areas and selecting a candidate projection area as a projection zone for projecting informational data from an autonomous aerial vehicle. In still another example, severs(s) 112 may reside in telecommunication network 110, e.g., at or near an ingress node coupling wireless access network(s) 115 to telecommunication network 110, in a data center of telecommunication network 110, or distributed at a plurality of data centers of telecommunication network 110, etc. Additionally, devices that are illustrated and/or described as using one form of communication (such as a cellular or non-cellular wireless communications, wired communications, etc.) may alternatively or additionally utilize one or more other forms of communication. For instance, in one example, server(s) 125 may communicate with AAV 160, such as for assigning tasks to AAV 160, monitoring for task completion, etc. via a wireless access point (AP) 122. For instance, server(s) 125 may be owned or operated by the same entity owning or controlling the area 190, and may have one or more wireless access points, such as AP 122, deployed throughout the area 190. Thus, communications between server(s) 125 and AAV 160 may not traverse any networks external to the entity. For instance, AP 122 and AAV 160 may establish a session via Wi-Fi Direct, LTE Direct, a 5G D2D sidelink, a DSRC session/pairing, etc. Thus, these and other modifications are all contemplated within the scope of the present disclosure.

Figure 2:
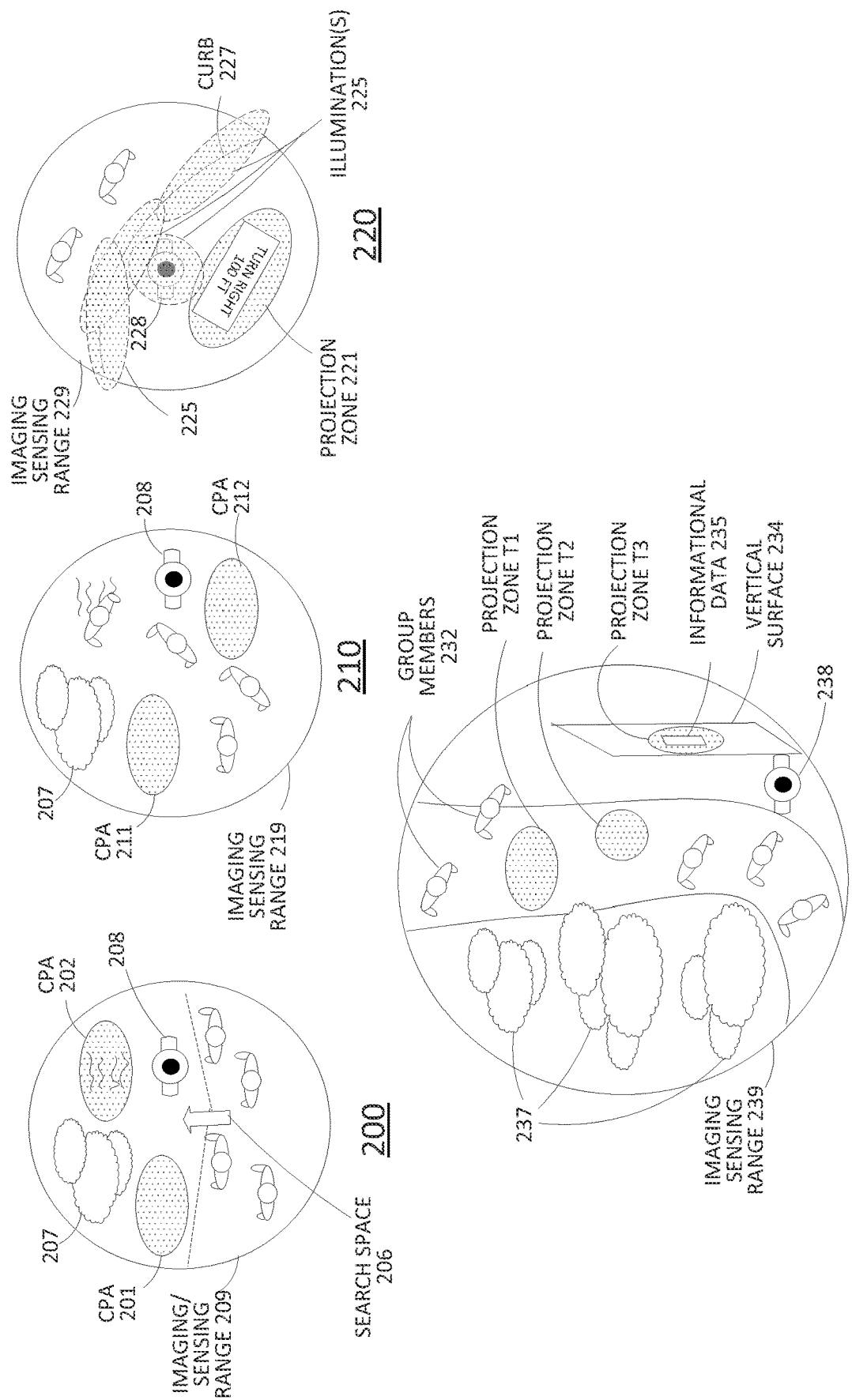
FIG. 2 illustrates example scenes of an autonomous aerial vehicle identifying candidate projection areas and selecting a candidate projection area as a projection zone for projecting informational data from the autonomous aerial vehicle, in accordance with the present disclosure.

FIG. 2 illustrates example scenes of an AAV identifying candidate projection areas and selecting a candidate projection area as a projection zone for projecting informational data from the AAV, in accordance with the present disclosure. The examples of FIG. 2 may relate the same components as illustrated in FIG. 1 and discussed above. For instance, in a first example scene 200, an AAV (such as AAV 160 of FIG. 1) may have an imaging/sensing range 209 and may be assigned to project informational data for a group of four people. In the present example, the AAV may first capture at least one image within the imaging/sensing range 209 of the AAV, determine the locations/positions and the orientations of the people (e.g., via any one or more of the methodologies described above), and identify a search space 206 within the imaging/sensing range 209. In the present example, the search space 206 may be portions of the imaging/sensing range 209 that are deemed to be visible to at least one person in the group. Since all of the people in the group are facing in the same general direction, the search space 206 may include only a portion of the imaging/sensing range 209, as indicated by the dotted lines and the arrow. For instance, the search space 206 may comprise a 165 degree field-of-view centered on the composite/average direction of the orientations of the people in the group.

Within the search space 206, the AAV may identify any surface irregularities, e.g., objects, painted markings, rough terrain, water, vegetation, people, or other items that would distort a projected image. For instance, the AAV may analyze the at least one image and identify bushes 207 and hydrant 208 as irregularities (the spaces occupied by the people of the group may also be considered to be areas of irregularity). Within the remaining portions of the search space 206, the AAV may then identify relatively irregularity free contiguous spaces as candidate projection areas (e.g., candidate projection areas (CPAs) 201 and 202). Next, the AAV may select between or among all CPAs based upon one or several criteria, such as noted above (e.g., number of members of group for whom the CPA is directly visible, size of the CPA, distance from projector of AAV, and/or surface characteristics of the CPA, etc.). In this case, CPA 201 and CPA 202 may be comparable in most respects. However, CPA 202 may have a somewhat rougher surface texture as compared to CPA 201. As such, CPA 201 may be selected as the projection zone and the AAV may project the informational data therein accordingly.

In a next example, scene 210 may comprise the same AAV collecting at least one image corresponding to imaging/sensing range 219. In the present example, the AAV may remain in the same position or relatively the same position above the group of four people. As such, imaging/sensing range 219 may be unchanged or relatively unchanged from the imaging/sensing range 209. In this case, however, the people have moved positions and orientations. AAV may detect the changed positions and orientations via any of the above-described techniques (such as obtaining location and orientation information from one or more network-based sources), via LiDAR sensing (which may utilize the same at least one image captured in the imaging/sensing range 219), via direct, peer-to-peer wireless communications with user devices of one or more people in the group, via RFID sensing of RFID tags carried by one or more of the people in the group, etc.). In this case, the entire or nearly the entire imaging/sensing range 219 is deemed to be visible to at least one of the people in the group. As such, the search space for identifying candidate projection areas may comprise the entire imaging/sensing range 219. At this time, the AAV may identify CPAs 211 and 212 as candidate projection areas. AAV may then apply the one or more criteria, such as discussed above, to select between and among the CPAs that are identified (e.g., at least CPA 211 and 212) to be used as the projection zone. In this case, CPA 211 and CPA 212 may be comparable in most all respects (e.g., same size, same or comparable surface features (e.g., same level of irregularity or lack thereof), same distance to AAV projector, etc.). However, CPA 211 is deemed to be visible to three of the members of the group, based upon their detected orientations, while CPA 212 is deemed to be visible to only one of the members of the group. Accordingly, the AAV may select CPA 211 as the projection zone and project the informational data therein accordingly. Alternatively, there may be instances where the informational data should be displayed to the lesser number of members if there are specific constraints and/or priorities, e.g., the lesser number of members may include a lead group tour guide, or a public safety personnel or first responder, e.g., a police officer, a fireman, a paramedic, a theme park personnel, and so on. Such detection can be implemented via image processing (e.g., detecting the uniforms worn by the individuals) or receiving a signal from these designated individuals (e.g., receiving an RF tag signal). The informational data may depend upon the particular reason for the deployment of the AAV, such as evacuation directions, directions to another type of destination, such as a restaurant where the group has a reservation, a ride at a theme park, etc., advertisements (which in one example may also include directions to a business promoting the advertisement, or the like), other types of public information, e.g., reminders to bikers and walkers to share a trail, reminders for pedestrians to stay on the right and bikers to stay on the left of a path, and so forth.

In a next example, scene 220 may comprise an AAV collecting at least one image corresponding to imaging/sensing range 229, determining a search space, identifying candidate projection areas, and selecting a candidate projection area as a projection zone. In this case, projection zone 221 may be selected and the informational data the AAV is tasked with presenting may be projected in/on the projection zone 221 (e.g., "turn right 100 ft"). For instance, projection zone 221 may comprise the largest contiguous area within the imaging/sensing range 229 that is most visible to two members of a group being tracked by the AAV, and/or that is the most free of obstructions, has the least irregularities, etc. In addition to projecting the informational data in the projection zone 221, the AAV may also provide visual indicators of one or more obstructions or other items/objects or features of interest, such as a curb, a fire hydrant, a wall, a fence, stairs, a ditch, uneven terrain, a waterway, and so forth.

In the present example, the AAV may identify a curb 227 and a hydrant 228. In one example, the AAV may identify these items as such, e.g., identifying the curb 227 specifically as a "curb," identifying the hydrant 228 as a "hydrant." However, in another example the AAV may more simply identify that these features stand out from the surrounding environment and may be considered as possible hazards or features of interest for avoidance or for further investigation by the people on the ground being tracked by the AAV. In either case, the AAV may visually highlight such features that are detected by overlaying the features with additional projector images, and/or by lighting up the features (illumination(s) 225) with one or more directional lighting units of the AAV, e.g., with different colored lighting.

In a next example, scene 230 illustrates an AAV changing a projection zone over time within an imaging/sensing range 239. For instance, the AAV may capture images from the imaging/sensing range 239 (e.g., via an optical camera, LiDAR unit, or the like), detect locations of group members 232, identify a search space, identify candidate projection areas, select a projection zone for time t1, and project informational data in the projection zone for time t1. Likewise, as time progresses, the AAV may capture images from the imaging/sensing range 239 (e.g., via an optical camera, LiDAR unit, or the like), detect new locations of group members 232, identify a new search space, identify new candidate projection areas, select a projection zone for time t2, and project informational data in the projection zone for time t2. For instance, as illustrated in the scene 230 of FIG. 2, the group members 232 may be walking along a path and may be receiving directions to a destination. As the group members 232 move, so does the calculated projection zone and the information data presented therein. As noted above, the positions, orientations, and sizes of the projection zones (e.g., the optimal candidate projection area from among those identified) may change from one time period to the next. Thus, as illustrated in the scene 230, the projection zone at time t2 is smaller and is of a different shape than at time t3.

Similarly, as discussed above, the candidate projection areas (and selected projection zone(s)) may not only comprise ground surfaces, but may also comprise non-ground surfaces, such as vertical surfaces (e.g., those perpendicular to the ground, e.g., a wall or side of a building, sides of buildings that may be sloped/angled rather than truly vertical, a roof, etc., or ground surfaces that are not flat (e.g., the side of an embankment or steep hill, etc.). In this regard, scene 230 also illustrates that at time t3, the projection zone may be on the vertical surface 234 in/on which informational data 235 may be projected.

FIG. 3 illustrates a flowchart of an example method 300 for identifying candidate projection areas and selecting a candidate projection area as a projection zone for projecting informational data from an autonomous aerial vehicle. In one example, steps, functions and/or operations of the method 300 may be performed by an AAV, such as AAV 160 or any one or more components thereof, or by AAV 160, and/or any one or more components thereof in conjunction with one or more other components of the system 100, such as server(s) 125, server(s) 112, elements of wireless access network 115, telecommunication network 110, and so forth. In one example, the steps, functions, or operations of method 300 may be performed by a computing device or processing system, such as computing system 400 and/or hardware processor element 402 as described in connection with FIG. 4 below. For instance, the computing system 400 may represent any one or more components of the system 100 (e.g., AAV 160) that is/are configured to perform the steps, functions and/or operations of the method 300. Similarly, in one example, the steps, functions, or operations of the method 300 may be performed by a processing system comprising one or more computing devices collectively configured to perform various steps, functions, and/or operations of the method 300. For instance, multiple instances of the computing system 400 may collectively function as a processing system. For illustrative purposes, the method 300 is described in greater detail below in connection with an example performed by a processing system. The method 300 begins in step 305 and proceeds to step 310.

At step 310, the processing system (e.g., of an autonomous aerial vehicle (AAV)) determines informational data to present to at least one person. For example, the informational data may comprise directional information, a safety message, and so forth. The informational data may be in a type of visual format, such as text form, image(s), video, etc. In one example, the at least one person may comprise a group of people. In one example, the group of people may be predefined and provided to the processing system. For instance, a management system for the AAV may instruct the AAV to engage in a task of providing the informational data as a visual projection for the specific group of users. However, in another example, the AAV on its own initiative or upon instruction from a management system may provide the informational data to one or more people who happen to be in a particular area.

At step 315, the processing system captures at least a first image via at least one imaging sensor of the autonomous aerial vehicle in a vicinity of the at least one person. In one example, the AAV may navigate to a rough/general location of the at least one person. For instance, the AAV may be provided with the location information of the at least one person or may track the at least one person via a user device, such as a mobile phone, RFID tag, or the like. In another example, the AAV may be assigned to an area, or may otherwise be in an area, and may capture the at least one image without prior knowledge of the presence of any people (or lack thereof). The at least one imaging sensor may comprise an optical camera of the AAV, a LiDAR unit, or the like. Thus, the at least one image may comprise one or more images captured via the camera, a 3D rendering captured via the LiDAR unit, and so forth. In one example, the at least one image may comprise two or more images capture via at least two different types of imaging sensors (e.g., combining the collection of one or more optical images with one or more LiDAR images/renderings).

At step 320, the processing system determines a first position and a first orientation of the at least one person. In one example, the determining the first position and the first orientation of the at least one person comprises determining first positions and first orientations of people within a group. In one example, step 320 may include obtaining location/position and/or orientation information for the at least one person (e.g., from a network-based system, such as a management system and/or from a cellular network infrastructure that maintains location information of user devices and provides such data with user consent, etc.). In one example, step 320 may include obtaining location information from a network-based system and then determining orientation(s) from on-board sensors (e.g., from a LiDAR unit). For instance, the first orientation (and/or all orientations of a group of two or more people) may be determined via analysis of the at least one image captured at step 315, where the obtained location information may be referenced to portions of the LiDAR image containing the at least one person.

In one example, step 320 may include identifying the at least one person, e.g., within the at least one image. For instance, as noted above, the at least one person may not be predefined for the AAV. As such, the processing system may first identify at least one person to whom the information data should be presented. In one example, step 320 may comprise establishing a session with one or more user devices of the at least one person, and obtaining location(s) and orientation(s) from the user device(s). For instance, the user devices may measure positions via GPS units, may measure orientations via gyroscopes and compasses, or the like. In one example, step 320 may comprise detecting the at least one person via at least one RFID tag or transponder of the at least one person, and/or may include detecting the at least one person (and determining position(s) and orientation(s)) via the at least one image (e.g., including at least one LiDAR image/rendering) as described above.

At optional step 325, the processing system identifies, based upon the first position and the first orientation of the at least one person, a projection search space, the projection search space comprising an area that is captured in the image, that is within range of a projector of the autonomous aerial vehicle, and that is visible to the at least one person (e.g., visible to at least one person in a group comprising a plurality of people). For instance, examples of identifying a projection search space are illustrated in FIGS. 1 and 2, and discussed above.

At step 330, the processing system identifies a plurality of candidate projection areas, each candidate projection area comprising a contiguous area within the at least the first image. In one example, step 330 may identify the plurality of candidate projection areas within the projection search space that may be identified at optional step 325. Each candidate projection area may comprise a contiguous area that is deemed to be visible to the at least one person (and in one example, that is within range of a projector of the AAV). In an example where the at least one person comprises a group of people, each candidate projection area may be determined to be visible to at least one of the people within the group (based upon the positions and orientations that may be determined at step 320). In one example, step 330 may include an analysis of the at least one image, wherein the search is bounded by a minimum contiguous area size. In other words, contiguous areas smaller than the threshold may be excluded from consideration as a candidate projection area. Similarly, there may be a maximum size beyond which the processing system will not attempt to identify contiguous areas as candidate projection zones. In one example, step 330 may identify those contiguous areas that are greater than the minimum size and that are relatively free of irregularities that would interfere with a visual projection of the information data. For instance, candidate projection areas may be completely free of irregularities, or may meet a requirement that any irregularity or irregularities are less than a threshold measure of a level of irregularity. For instance, image processing of the at least one image may apply scores or values to sub-regions within the image(s) regarding surface/terrain variability in terms of surface level/height, color, contrast, reflectance, etc. Similarly, dark surfaces, such as asphalt may be scored lower than lighter surfaces, such as concrete, depending upon the color(s) of the visual projection of the informational data, current lighting condition in the area, or even the time of day. However, in one example, the processing system may select the color and/or contrast between text and images of the projection to optimize for the surface color(s) of a candidate projection area that is selected as the projection zone. It should also be noted that the plurality of candidate projection areas may include at least one of: a ground surface candidate projection area or a non-ground surface projection area (e.g., a vertical surface perpendicular to the ground, such as a wall, sloped surfaces, such as a pitched roof, a flat roof that may be visible to the at least one person, who may be on a taller surface nearby, or who may be on the roof itself, outdoor pavement on the top of a parking deck, etc.).

At step 335, the processing system selects one of the plurality of candidate projection areas as a projection zone. In one example, the one of the plurality of candidate projection areas is selected as a projection zone based upon at least one factor. For instance, the at least one factor may comprise a size of the one of the plurality of projection areas (e.g., as compared to the sizes of each of the plurality of candidate projection areas), a number of people within the group to whom the one of the plurality of candidate projection areas is deemed to be visible (e.g., the one most likely to be visible may be selected, or may be selected with greater weight/likelihood if combined with other factors), a measure of at least one surface characteristic of the one of the plurality of candidate projection areas (e.g., one or more measures of texture, glossiness, dark/light contrast, color contrasts, shade contrasts, a number/quantity and/or size of obstruction(s) or other irregularities within the one of the plurality of candidate projection areas (where obstructions can include one or more people within the group and/or one or more other people in an area as well as non-human objects), etc.), or a range of the one of the plurality of candidate projection areas with respect to a projector of the autonomous aerial vehicle (e.g., a candidate projection area that is closer to the projector may be selected with a greater weight/likelihood). In one example, the processing system may select (or may preferentially select in accordance with a weighting) a non-ground surface candidate projection area based upon a determination of a safety factor. For instance, the processing system may identify that the at least one user is approaching an intersection and that projection on the ground may be less safe than projecting on a vertical surface, such as a wall of a nearby building (even if the contiguous space on the wall is smaller than an available candidate projection areas on the ground). Furthermore, it should be noted that when a candidate projection area is selected as being "visible" to at least one person, it only means that it is more likely than not that the person will be able to view projected information in the candidate projection area based on the position and orientation of the person. As such, there is no requirement that the person actually saw the information, but only that the candidate projection area is deemed to be visible to the person, e.g., based on a calculation.

At optional step 340, the processing system may determine an orientation to display the informational data in the projection zone, based upon a location of the projection zone, the first position, and the first orientation. In one example, the orientation of the projection of the informational data in the projection zone may be based upon a predominant orientation of the group of users (e.g., a consensus or average direction of the orientation(s), and/or further based upon the position(s)). For instance, text, video, images, or the like may be presented upright with respect to the predomination orientation.

At step 345, the processing system projects the informational data on the projection zone via a projector of the AAV. For instance, the projection may be as illustrated and described in connection with any of the examples of FIGS. 1 and 2.

At optional step 350, the processing system may detect at least one item of interest in the first projection zone. For instance, the item of interest may comprise a hazard, such as a curb, a fire hydrant, a wall, a fence, at least one step (e.g., stairs), uneven terrain, such as a ditch, a rocky area, etc., a waterway, an aircraft operations area, a roadway, or the like, or can be something like a fire hydrant that may be identified for first responders, a defibrillator, a gate or door, the destination to which informational data is directing the person or people, etc. In one example, the at least one item of interest may be detected via at least one detection model (e.g., an MLM), such as discussed above. In one example, the at least one item of interest may be detected from the same at least one image that was captured at step 315. The at least one item of interest may be within the projection zone, or may be elsewhere within the imaging/sensing range of the AAV.

At optional step 355, the processing system may illuminate the at least one item of interest via at least one lighting unit of the AAV. The at least one lighting unit may comprise one or more directional LEDs or the like, and/or may comprise the projector of the AAV, wherein the projector may simultaneously illuminate the at least one item of interest and project the informational data in the projection zone. For instance, the processing system may illuminate a curb in the dark so that the at least one person is less likely to trip when stepping off the curb.

At optional step 360, the processing system may determine whether to continue. For instance, if the task is to corral the at least one user to a safe location and the at least one user is not yet at the safe location, the method 300 may return to step 315 and continue through one or more additional iterations (e.g., capturing at least a second image via the at least one imaging sensor of the AAV, determining a second position and a second orientation of the at least one person, identifying, based upon the second position and the second orientation of the at least one person, a second plurality of candidate projection areas visible to the at least one person, selecting one of the second plurality of candidate projection areas as a second projection zone, projecting the informational data on the second projection zone, and so forth). Otherwise, the method 300 may proceed to step 395. Alternatively, in one example, the method 300 may return to step 310 to receive a new assignment of new informational data to project for the same or a different at least one person.

Following step 345 or optional step 355, the method 300 may proceed to step 395. At step 395, the method 300 ends.

It should be noted that the method 300 may be expanded to include additional steps, or may be modified to replace steps with different steps, to combine steps, to omit steps, to perform steps in a different order, and so forth. For instance, in one example, the processing system may repeat one or more steps of the method 300, such as steps 315-345 or steps 315-355 for subsequent time periods, steps 310-345 or steps 310-355 for different sets of one or more people and/or different informational data, and so on. In one example, the method 300 may additionally comprise summoning human assistance, one or more additional AAVs, or surface-operating autonomous vehicles to help guide the at least one person to a destination, projecting the same or additional information in an audible format via a loudspeaker of the AAV, etc. In still another example, the method 300 may include establishing communication sessions with one or more users devices (e.g., one or more user devices of the at least one person). Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 4 depicts a high-level block diagram of a computing system 500 (e.g., a computing device or processing system) specifically programmed to perform the functions described herein. For example, any one or more components, devices, and/or systems illustrated in FIG. 1 or described in connection with FIG. 2 or 3, may be implemented as the computing system 400. As depicted in FIG. 4, the computing system 400 comprises a hardware processor element 402 (e.g., comprising one or more hardware processors, which may include one or more microprocessor(s), one or more central processing units (CPUs), and/or the like, where the hardware processor element 402 may also represent one example of a "processing system" as referred to herein), a memory 404, (e.g., random access memory (RAM), read only memory (ROM), a disk drive, an optical drive, a magnetic drive, and/or a Universal Serial Bus (USB) drive), a module 405 for identifying candidate projection areas and selecting a candidate projection area as a projection zone for projecting informational data from an autonomous aerial vehicle, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 402 is shown, the computing system 400 may employ a plurality of hardware processor elements. Furthermore, although only one computing device is shown in FIG. 4, if the method(s) as discussed above is implemented in a distributed or parallel manner for a particular illustrative example, e.g., the steps of the above method(s) or the entire method(s) are implemented across multiple or parallel computing devices, then the computing system 400 of FIG. 4 may represent each of those multiple or parallel computing devices. Furthermore, one or more hardware processor elements (e.g., hardware processor element 402) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 402 can also be configured or programmed to cause other devices to perform one or more operations as discussed above. In other words, the hardware processor element 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 405 for identifying candidate projection areas and selecting a candidate projection area as a projection zone for projecting informational data from an autonomous aerial vehicle (e.g., a software program comprising computer-executable instructions) can be loaded into memory 404 and executed by hardware processor element 402 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 402) executing the computer-readable instructions relating to the above described method(s) can be perceived as a programmed processor or a specialized processor. As such, the present module 405 for an identifying candidate projection areas and selecting a candidate projection area as a projection zone for projecting informational data from an autonomous aerial vehicle (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
    determining, by a processing system of an autonomous aerial vehicle, informational data to present for at least one person within a group of people;
    capturing, by the processing system, at least a first image via at least one imaging sensor of the autonomous aerial vehicle in a vicinity of the at least one person;
    determining, by the processing system, a first position of a plurality of positions and a first orientation of a plurality of orientations of the at least one person, wherein the determining the first position and the first orientation of the at least one person comprises determining the plurality of positions and the plurality of orientations of people within the group, wherein the plurality of positions is determined from location information from a network-based system that maintains location information of user devices associated with the people within the group, and wherein the plurality of orientations is determined from the at least the first image;
    identifying, by the processing system based upon the first position and the first orientation of the at least one person, a plurality of candidate projection areas, each candidate projection area comprising a contiguous area within the at least the first image that is deemed to be visible to the at least one person in accordance with the first position and the first orientation;
    selecting, by the processing system, one of the plurality of candidate projection areas as a projection zone in accordance with a plurality of factors, wherein the plurality of factors comprises: a number of people within the group to whom the one of the plurality of candidate projection areas is deemed to be visible in accordance with the plurality of positions and the plurality of orientations and a measure of at least one surface characteristic of the one of the plurality of candidate projection areas; and
    projecting, by the processing system, the informational data on the projection zone via a projector.

2. The method of claim 1, further comprising:
identifying, based upon the first position and the first orientation of the at least one person, a projection search space, the projection search space comprising an area that is captured in the at least the first image, that is within range of the projector of the autonomous aerial vehicle, and that is deemed to be visible to the at least one person.

3. The method of claim 1, further comprising:
determining an orientation to display the informational data in the projection zone, based upon a location of the projection zone, the first position, and the first orientation.

4. The method of claim 1, wherein the informational data comprises directional information.

5. The method of claim 1, wherein the informational data comprises a safety message.

6. The method of claim 1, wherein the group of people is predefined, or the group of people is detected by the processing system via at least one of: the at least one imaging sensor or via at least one other sensor of the autonomous aerial vehicle.

7. The method of claim 6, wherein the identifying the plurality of candidate projection areas is based upon the plurality of positions and the plurality of orientations of the people within the group, wherein each candidate projection area is deemed to be visible to at least one of the people within the group.

8. The method of claim 7, wherein the plurality of factors further comprises:
a size of the one of the plurality of projection areas.

9. The method of claim 1, wherein the plurality of factors further comprises:
a range of the one of the plurality of candidate projection areas with respect to the projector of the autonomous aerial vehicle.

10. The method of claim 1, wherein the plurality of candidate projection areas includes at least one of:
a ground surface candidate projection area; or
a non-ground surface candidate projection area.

11. The method of claim 1, further comprising:
capturing at least a second image via the at least one imaging sensor of the autonomous aerial vehicle;
determining a second position and a second orientation of the at least one person;
identifying, based upon the second position and the second orientation of the at least one person, a second plurality of candidate projection areas deemed to be visible to the at least one person;
selecting one of the second plurality of candidate projection areas as a second projection zone; and
projecting the informational data on the second projection zone.

12. The method of claim 11, wherein the second projection zone is of at least one of:
a different size from a size of the first projection zone;
a different shape from a shape of the first projection zone; or
a different orientation from an orientation of the first projection zone.

13. The method of claim 1, further comprising:
detecting at least one item of interest in the first projection zone; and
illuminating the at least one item of interest via at least one lighting unit of the autonomous aerial vehicle.

14. The method of claim 13, wherein the detecting the at least one item of interest comprises detecting an outline of the at least one item of interest, and wherein the illuminating comprises highlighting the outline of the at least one item of interest via the at least one lighting unit.

15. A non-transitory computer-readable medium storing instructions which, when executed by a processing system of an autonomous aerial vehicle including at least one processor, cause the processing system to perform operations, the operations comprising:
determining informational data to present for at least one person within a group of people;
capturing at least a first image via at least one imaging sensor of the autonomous aerial vehicle in a vicinity of the at least one person;
determining a first position of a plurality of positions and a first orientation of a plurality of orientations of the at least one person, wherein the determining the first position and the first orientation of the at least one person comprises determining the plurality of positions and the plurality of orientations of people within the group, wherein the plurality of positions is determined from location information from a network-based system that maintains location information of user devices associated with the people within the group, and wherein the plurality of orientations is determined from the at least the first image;
identifying, based upon the first position and the first orientation of the at least one person, a plurality of candidate projection areas, each candidate projection area comprising a contiguous area within the at least the first image that is deemed to be visible to the at least one person in accordance with the first position and the first orientation;
selecting one of the plurality of candidate projection areas as a projection zone in accordance with a plurality of factors, wherein the plurality of factors comprises: a number of people within the group to whom the one of the plurality of candidate projection areas is deemed to be visible in accordance with the plurality of positions and the plurality of orientations and a measure of at least one surface characteristic of the one of the plurality of candidate projection areas; and
projecting the informational data on the projection zone via a projector.

16. An apparatus comprising:
a processing system including at least one processor of an autonomous aerial vehicle; and
a computer-readable medium storing instructions which, when executed by the processing system, cause the processing system to perform operations, the operations comprising:
determining informational data to present for at least one person within a group of people;
capturing at least a first image via at least one imaging sensor of the autonomous aerial vehicle in a vicinity of the at least one person;
determining a first position of a plurality of positions and a first orientation of a plurality of orientations of the at least one person, wherein the determining the first position and the first orientation of the at least one person comprises determining the plurality of positions and the plurality of orientations of people within the group, wherein the plurality of positions is determined from location information from a network-based system that maintains location information of user devices associated with the people within the group, and wherein the plurality of orientations is determined from the at least the first image;

identifying, based upon the first position and the first orientation of the at least one person, a plurality of candidate projection areas, each candidate projection area comprising a contiguous area within the at least the first image that is deemed to be visible to the at least one person in accordance with the first position and the first orientation;

selecting one of the plurality of candidate projection areas as a projection zone in accordance with a plurality of factors, wherein the plurality of factors comprises: a number of people within the group to whom the one of the plurality of candidate projection areas is deemed to be visible in accordance with the plurality of positions and the plurality of orientations and a measure of at least one surface characteristic of the one of the plurality of candidate projection areas; and projecting the informational data on the projection zone via a projector.

17. The apparatus of claim 16, wherein the operations further comprise:

identifying, based upon the first position and the first orientation of the at least one person, a projection search space, the projection search space comprising an area that is captured in the at least the first image, that is within range of the projector of the autonomous aerial vehicle, and that is deemed to be visible to the at least one person.

18. The apparatus of claim 16, wherein the operations further comprise:

determining an orientation to display the informational data in the projection zone, based upon a location of the projection zone, the first position, and the first orientation.

19. The apparatus of claim 16, wherein the informational data comprises directional information.

20. The apparatus of claim 16, wherein the informational data comprises a safety message.

* * * * *